United States Patent [19]

Berger et al.

[11] Patent Number: 5,091,975
[45] Date of Patent: Feb. 25, 1992

[54] METHOD AND AN APPARATUS FOR ELECTRONICALLY COMPRESSING A TRANSACTION WITH A HUMAN SIGNATURE

[75] Inventors: Toby Berger, Ithaca, N.Y.; Daniel H. Miller, Kensington, Calif.

[73] Assignee: Teknekron Communications Systems, Inc., Berkeley, Calif.

[21] Appl. No.: 460,755

[22] Filed: Jan. 4, 1990

[51] Int. Cl.⁵ .................... G06K 9/36; G06K 9/46; G06F 15/30; G07G 1/14
[52] U.S. Cl. ............................... 382/56; 382/3; 382/21; 358/261.3; 235/379; 902/22
[58] Field of Search ................. 382/3, 56, 21; 358/261.3; 902/22, 39; 364/405; 235/379

[56] References Cited

U.S. PATENT DOCUMENTS

| | | | |
|---|---|---|---|
| 3,159,743 | 12/1964 | Brouillette, Jr. et al. | 235/198 |
| 3,383,516 | 5/1968 | Leimer | 250/219 |
| 3,396,276 | 8/1968 | Hardin et al. | 250/202 |
| 3,541,510 | 11/1970 | Nishioka | 340/146.3 |
| 3,609,685 | 9/1971 | Deutsch | 340/146.3 AE |
| 3,668,636 | 6/1972 | Blucher | 340/146.3 AE |
| 4,020,463 | 4/1977 | Himmel | 382/3 |
| 4,032,979 | 6/1977 | Rice | 360/40 |
| 4,087,788 | 5/1978 | Johannesson | 382/56 |
| 4,161,725 | 7/1979 | Stakhov | 340/347 |
| 4,290,051 | 9/1981 | Stakhov et al. | 340/347 DD |
| 4,321,682 | 3/1982 | Koshikawa | 364/520 |
| 4,385,285 | 5/1983 | Horst et al. | 382/3 |
| 4,531,189 | 7/1985 | Mosier et al. | 364/550 |
| 4,550,438 | 10/1985 | Convis et al. | 382/56 |
| 4,566,127 | 1/1986 | Sekiya et al. | 382/56 |
| 4,597,101 | 6/1986 | Kishimoto et al. | 382/13 |
| 4,628,298 | 12/1986 | Hafle et al. | 340/347 |
| 4,646,356 | 2/1987 | Anderson et al. | 382/56 |
| 4,653,107 | 3/1987 | Shojima et al. | 382/13 |
| 4,748,511 | 5/1988 | Nichols et al. | 358/256 |
| 4,752,965 | 6/1988 | Dunkley et al. | 382/3 |
| 4,776,022 | 10/1988 | Fox et al. | 382/8 |
| 4,811,407 | 3/1989 | Blokker, Jr. et al. | 382/1 |
| 4,818,969 | 4/1989 | Krakauer et al. | 341/80 |
| 4,922,545 | 5/1990 | Endoh | 382/56 |
| 4,937,681 | 6/1990 | Fujinawa et al. | 358/261.3 |

OTHER PUBLICATIONS

Neuhoff et al., "A Rate and Distortion Analysis of Chain Codes . . . ", IEEE Transactions on Inf. Theory, vol. It-31, No. 1, Jan. 1985.
Freeman, "Computer Processing of Line-Drawing Images" Computing Surveys, vol. 6, No. 1, Mar. 1974.

Primary Examiner—Michael Razavi
Assistant Examiner—Michael Cammarata
Attorney, Agent, or Firm—Limbach, Limbach & Sutton

[57] ABSTRACT

In the present invention a method of compressing a signature signal is disclosed. The signature signal is divided into a plurality of signature segment signals where each segment is encoded by using a modified ring-encoding method, such that the total number of grid points along the perimeter of all the rings can be stored in an 8-bit byte. In one embodiment of the method of the present invention, a Fibonacci series is used to determine the relative spacing of the rings. The present invention also discloses a method and apparatus for electronically processing a POS transaction with a human signature for verification of the transaction, as well as for request of extension of credit by a credit company. The signature is electronically captured, compressed and combined with a transaction signal which is representative of the transaction. The record signal is then processed by the credit company for verification of the transaction or for requesting extension of credit.

4 Claims, 3 Drawing Sheets

METHOD AND AN APPARATUS FOR ELECTRONICALLY COMPRESSING A TRANSACTION WITH A HUMAN SIGNATURE

TECHNICAL FIELD

The present invention relates to a method and an apparatus for electronically processing a transaction having a human signature for verification of the transaction. More particularly, the present invention relates to a method and an apparatus whereby the human signature is transformed into an electronic signal which is then compressed. The compressed signature signal is combined with an electronic signal representative of the transaction to form a record signal.

BACKGROUND OF THE INVENTION

Electronic recording of Point Of Sale (POS) transactions is well-known in the art. However, POS transactions of the type involving a human signature, such as those requesting extension of credit, have required a large amount of storage to capture the human signature in electronic form. The large amount of storage required for a signature signal is acceptable in certain industries where the transaction volume is low. For example, in the package delivery industry where a human signature is recorded along with the delivery of a package, the human signature is converted into an electronic signal which is recorded and stored.

However, in POS transactions involving requests for credit extension where a large number of transactions are involved, the storage requirement for record signals, each comprised of a signature signal and a transaction signal, becomes enormous.

Modified ring encoding is one of the techniques that has been used to encode weather maps, contour maps and other pictorial line-drawings. See, for example, "A Rate And Distortion Analysis Of Chain Codes For Line Drawings" by David L. Neuhoff and Kenneth G. Castor, IEEE Transactions On Information Theory, Vol. IT-31, No. 1, January 1985. However, the application of the modified ring-encoding technique to signature compression in a manner to store signature signals in a well-defined bit field has not been known heretofore.

SUMMARY OF THE INVENTION

In the present invention, a method for electronically processing a transaction having a human signature for verification of the transaction is disclosed. The method comprises the steps of electronically capturing the transaction data at the point of transaction to form a transaction signal. The human signature is electronically captured at the point of transaction to form a signature signal. The signature signal is compressed to form a compressed signal signature. The compressed signal signature is combined with the transaction signal to form a record signal. The record signal is processed for verification of the transaction.

An apparatus to carrying out the foregoing method is also disclosed.

DETAILED DESCRIPTION OF THE DRAWINGS

Figure 1:
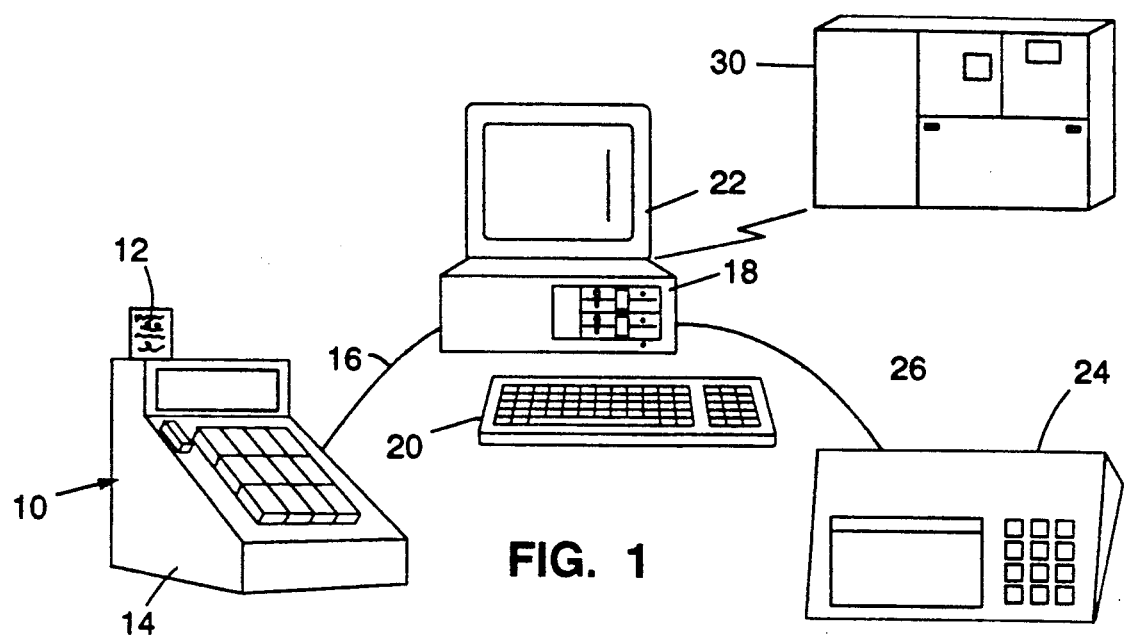
FIG. 1 is a perspective view of an apparatus of the present invention.

Referring to FIG. 1, there is shown a perspective view of an apparatus 10 of the present invention. The apparatus 10 comprises a machine 14, such as a cash register, to record a Point Of Sale (POS) transaction. A typical POS transaction is a retail transaction. The machine 14 generates a paper copy 12 of the transaction. The machine 14 also generates a transaction signal, which is representative of the transaction recorded on the paper 12, and is transmitted along a first cable 16 to a first computer 18. Thus, the transaction signal includes alphanumeric data related to the transaction, such as date, description of goods, quantity and amount of sales.

The apparatus 10 of the present invention is suited for use in a POS transaction of the type requiring a human signature for verification of the transaction, as well as for requesting extension of credit for the transaction by a credit company. When a paper copy 12 of the POS transaction is generated, the paper copy 12 is placed on an electronic tablet 24. The electronic tablet 24 can electronically capture images of drawings drawn thereon. The purchaser applies his/her signature on the paper copy 12 over the tablet 24. Thus, the human signature is recorded on the paper copy 12 and is simultaneously captured electronically by the tablet 24. The human signature captured by the electronic tablet 24 in the form of a signature signal is sent over a second cable 26 to the first computer 18.

The first computer 18 has a keyboard 20 associated therewith and a display 22. The first computer 18 executes a program. The program electronically compresses the signature signal to form a compressed signature signal.

The compressed signature signal is combined with the transaction signal from the machine 14 to form a record signal. The record signal can be stored or can be further processed by transmitting it to a second computer 30 to request verification of the transaction or for extension of credit by the credit company. The record signal can also be used to regenerate the human signature, in printed format, from the compressed signature signal, along with a printed copy of the data from the transaction signal. In this manner, a print copy of the transaction and the human signature can always be regenerated. Typically, the regenerated transaction and human signature is performed at a location remote to the POS transaction. The regeneration of the transaction and human signature remotely can be performed as soon as the record signal is received or the regeneration can be performed remotely in time. In the event the regeneration is performed as soon as the record signal is received, the regenerated human signature can be compared to a previously recorded human signature for verification purpose. A human signature regenerated remotely in time can be used, for example, to authenticate a charge on a credit card.

The various components of the apparatus 10 can be as follows: An electronic cash register 14 can be of the type, manufactured by NCR Corporation, which supplies the transaction signal to the computer 18. The electronic tablet 24 can be of the type ScriptWriter, manufactured by Data Entry Systems, to supply a signature signal to the computer 18. The computer 18 can be an IBM PC/AT or compatible thereof executing the program attached herewith as Exhibit A. Another embodiment of the invention includes a computer with a built-in writing pad, or an electronic cash register connected to a writing pad. Typically, signature compression is accomplished in the writing pad, and a separate computer is not needed.

Figure 2:
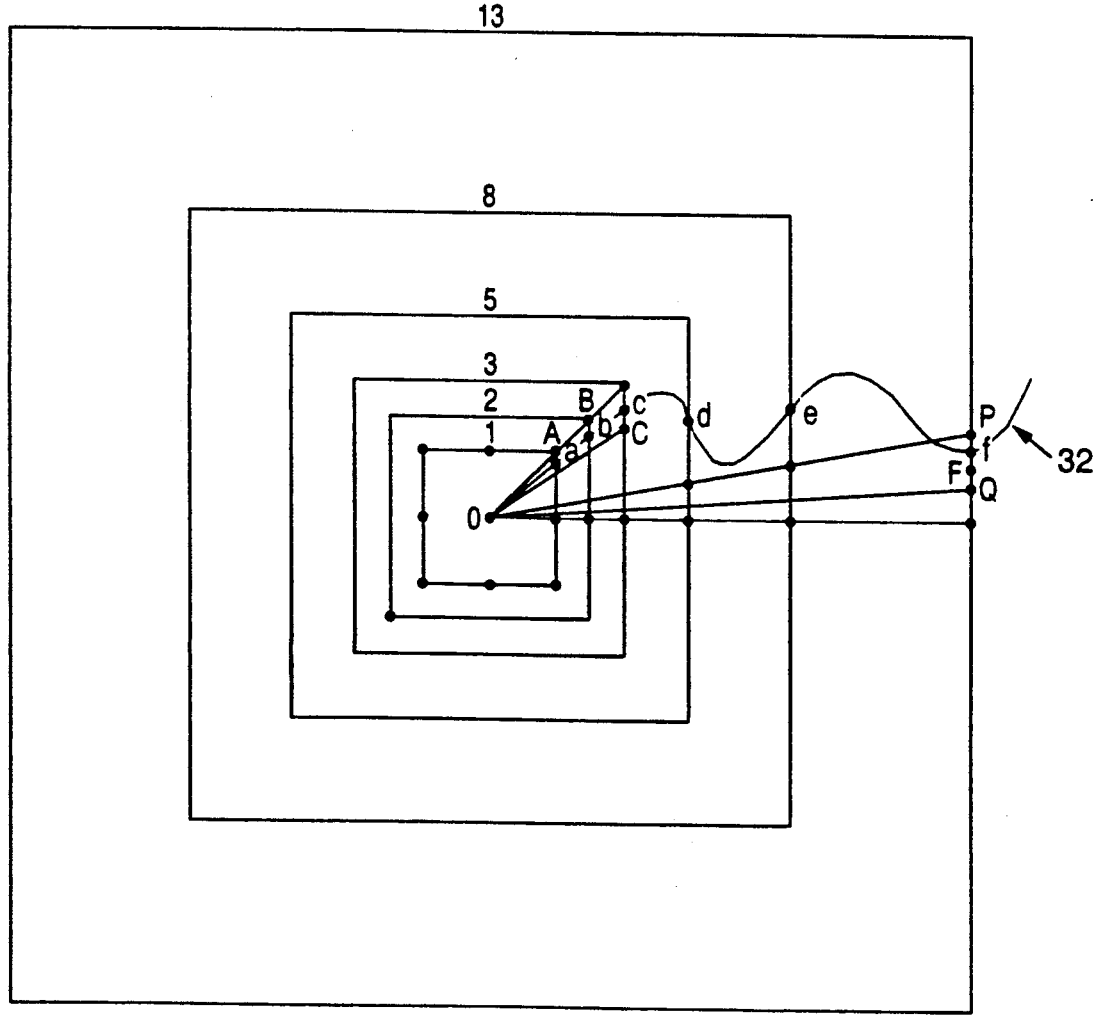
FIG. 2 is a graphical image of one embodiment of the encoding technique of the present invention, showing the encoding of a portion of a human signature.

The program executed by the computer 18 in the apparatus 10 of the present invention divides the signature signal into a plurality of segments. Each of those segments is encoded in eight bits. The encoding of each of the segments is in accordance with a variation of the modified ring-encoding technique The operation of the program will now be described with respect to the illustration shown in FIG. 2, wherein a portion of a signature signal 32 is shown. A grid is superimposed over the portion of the signature signal 32. In one example the grid has a resolution of 50 lines per inch. The starting point of the first segment is designated as "O" is the origin of the graph. A plurality of squares centered at the origin and whose right-hand vertical size passes through the coordinates (0,1), (0,2), (0,3) (0,5), (0,8) and (0,13) are constructed. Although these are squares, we shall refer to them hereinafter as rings and in particular as the 1-ring, 2-ring, 3-ring, 5-ring, 8-ring and 13-ring, respectively. In fact, any set of closed geometries of increasing size can be used. Thus, the 1-ring is spaced one unit or 1/50 inch away from the starting point (0,0). The 2-ring, similarly, is spaced at 2/50 inch away from (0,0). The 13-ring, the most distant ring from (0,0) is spaced at a distance of 13/50 inch away from the coordinate (0,0). As can be seen from the foregoing, the spacing of the rings from one another and from the origin is not uniform. The particular example shown hereinabove was selected based upon a Fibonacci series of 1, 2, 3, 5, 8 and 13. Of course, any other sequence can be used. As will be shown, this particular choice of ring spacings has important advantages.

Each of the rings has the number of grid points along its perimeter equal to eight times the spacing of that ring from the origin. Thus, the 13-ring has 104 (8×13) grid points along its perimeter. The 8-ring has 64 (8×8) grid points along its perimeter. The sum of all of the grid points is equal to:

$$(1+2+3+5+8+13) \times 8 = 256$$

256 grid points have the distinct advantage that they can be encoded in a single 8-bit byte.

To segment the signature signal 32 into a plurality of segments and to encode each of those segments, the following method is employed:

1. The origin is first located.
2. The points at which the signature signal 32 intersect each of the rings, i.e. a,b, ... f, is calculated.
3. The grid points, i.e. A,B ... F, which are closest to the points of intersection, a,b ... f, of the signature signal 32 through each of the rings are also calculated.
4. Proceeding with the outermost ring, i.e., 13-ring, points P and Q which denote points on the 13-ring at a distance of one-half spacing of the grid point from the grid point F calculated in accordance with step three (3) above is determined. A cone-shape region determined by the lines PO and QO is then formed.
5. Each of the points of intersection, a,b ... f, of the signature signal 32 with each of the rings is determined to see if they lie within the region formed by the cone POQ. If all of the points of intersection a, b, c, d, e and f lie within the region POQ, then for the segment from o to f of the signature signal 32, the segment is encoded as the value at F. The following table shows the encoded values:

Grid points along 1-ring: 0–7
    Grid points along 2-ring: 8–23
    Grid points along 3-ring: 24–47
    Grid points along 5-ring: 48–87
    Grid points along 8-ring: 88–151
    Grid points along 13-ring: 152–255

6. If there are some points (a-f) which do not lie in the region defined by the cone POQ, then the method proceeds to the next smaller-size ring, 8-ring. A new cone is then established and points are tested against the new cone.
7. This process continues until we find the largest-size ring that satisfies the cone criteria. In the example shown in FIG. 2, it can be seen graphically that the largest-size such ring is the 3-ring. The points a, b, and c lie in the region defined by the cone POQ for the 3-ring.
8. The segment O-c is then encoded. The origin is shifted to C, the grid point nearest to c. The method returns back to step two (2).

Figure 3:
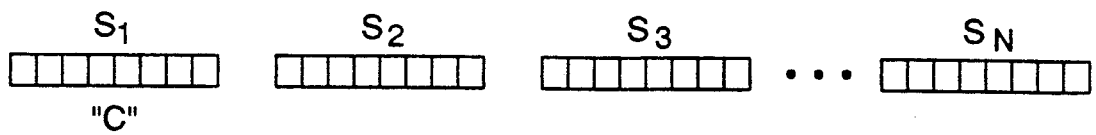
FIG. 3 is a schematic diagram showing the encoding of segments of a human signature.

As can be seen from the foregoing, each of the segments of the signature signal 32 can be stored in an 8-bit byte storage location, the canonical microprocessor data size. The signature signal 32 is segmented into a plurality of such 8-bit byte segments. Graphically, this is shown in FIG. 3, wherein the segment $S_1 \ldots S_n$ comprise the encoded segment signature signals for the signature signal 32, e.g. with $S_1$ having the value for the grid point "C" etc.

Figure 4:
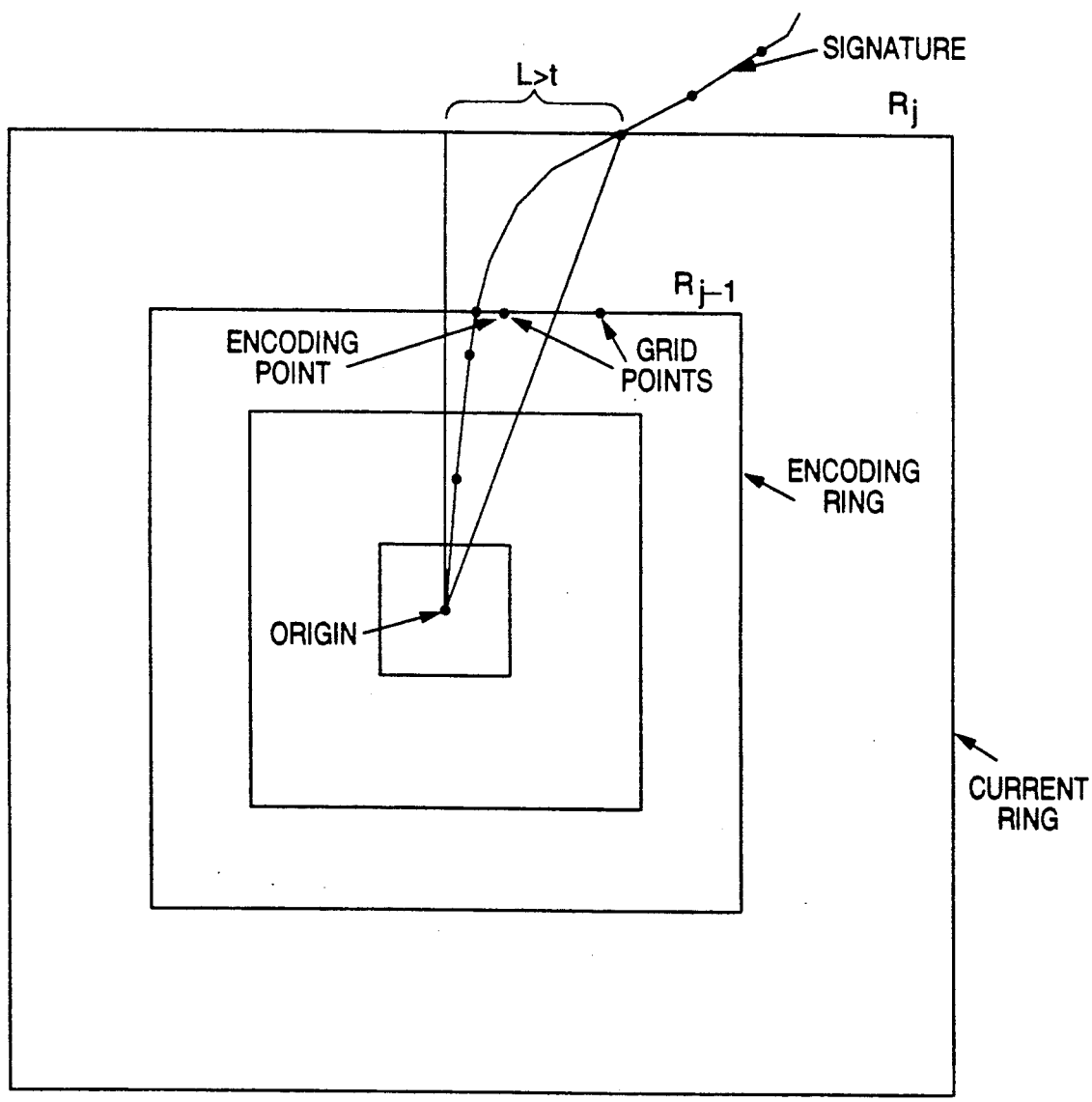
FIG. 4 is a graphical image of another embodiment of the encoding technique of the present invention, showing the encoding of a portion of a human signature.

Referring to FIG. 4, there is shown a variation of the method of the present invention to encode a segment of the signature signal 32, which is computationally more efficient than the method described heretofore. The method is as follows:

1. The ring set is placed at the origin.
2. A ring closest to the origin is first chosen as the current ring.
3. The smallest size of the cone emanating from the origin to the current ring containing all of the signature points, of the segment of the signature signal, from the origin to the current ring is calculated.
4. The cone of step 3 intersects the current ring, with the intersection having a length L, which is calculated.
5. The length of the intersection calculated from step 4 is compared to a specified tolerance t, (e.g. a multiple of the separation of grid points along the current ring).

6. If the length does not exceed the tolerance, the next outermost ring is chosen as the current ring and the method reverts back to step three (3).
7. If the length exceeds the tolerance, the previous current ring is chosen as the encoding ring. The grid point along the encoding ring which is closest to the signature signal is chosen to encode the signature segment.
8. The origin is shifted to the chosen grid point. The method reverts back to step two (2).

Figure 5:
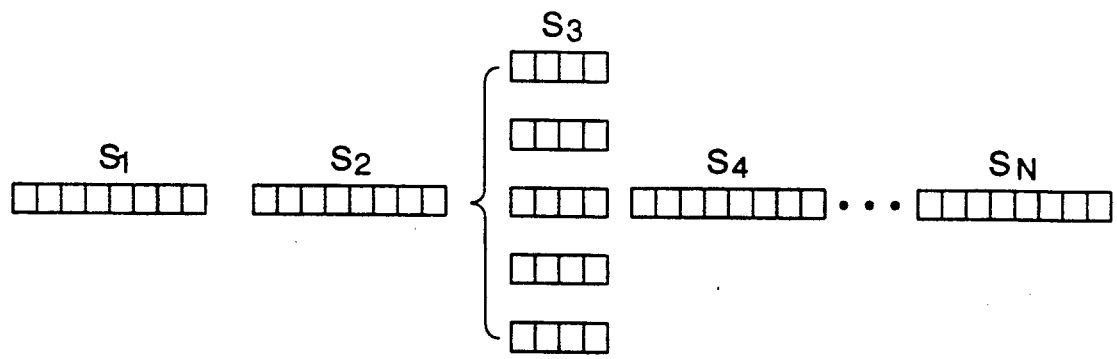
FIG. 5 is a schematic diagram of the conditional coding of the segments of a signature in accordance with the method of the present invention.

Referring to FIG. 5, there is shown a variation of the method of the present invention. Signature segments $S_1$ and $S_2$ are encoded, each in an 8-bit byte field, in accordance with the method of the present invention. However, signature segment $S_3$ can be an address to a library of encoded signature segments, determined a priori, to be the most likely ones to follow the observed values of signature segments $S_1$ and $S_2$. Thus, for example, if a library contains 15 of the commonly-expected types of encoded signature segments, the coding for segment 3 needs to be only 4-bits wide. Four-bits would address all 16 possible cases for the address location within the library. (The 16th case is where the next segment is not one of the segments from the library). Thus, if the encoded signature segment $S_3$ is one of the encoded signature segments in the library, then the number of bits required to describe the encoded signature segment $S_3$ is reduced from eight to four bits. This provides for further compression of the signature signal. Of course, if the actual encoded signature segment $S_3$ is not one of the segments stored in the library, then the actual encoded signature segment $S_3$ would be used and this would be 8 bits more. This aspect of encoding signature segments as an address within a library of a priori determined signature segments is termed conditional coding. As shown in FIG. 5, $S_4 \ldots S_n$ can each be either an address in the library of a priori determined conditionally most likely encoded signature segments, or the encoded signature segment itself if the actual encoded signature segment is not one contained within the library.

Figure 6:
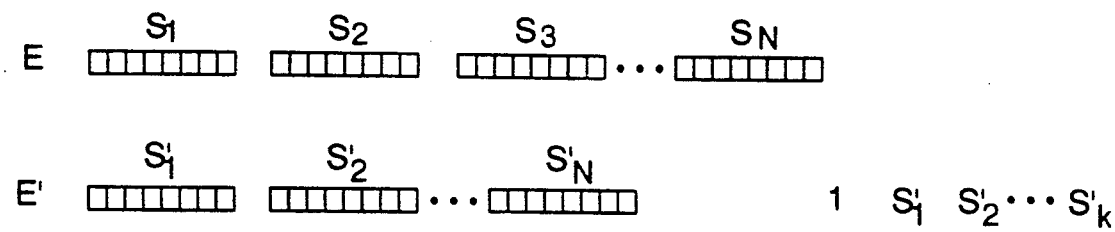
FIG. 6 is a schematic drawing showing encoding of a signature in accordance with two different methods and the method of the present invention for selecting and encoding the results of these two different methods.

Referring to FIG. 6, there is shown graphically yet another variation of the present invention. The signature signal 32 can be encoded by a number of different methods (including well-known prior art methods). Thus, for example, the encoded signature segments comprising of $S_1 \ldots S_n$ is encoded based upon an encoding method E. Using a second different encoding method, E', the identical signature signal 32 is encoded as segments $S_1' \ldots S_k'$. If the result of encoding by method E' results in an encoded signature signal requiring less total storage than the encoded signature signal method E, then a single bit (preceding or following the encoded signature signal) is used to distinguish the type of method of encoding which resulted in that encoded signature signal. In the example shown in FIG. 6, using the method E', K bytes of storage are required for the signature signal 32. Using the encoding method E, N bytes of storage are required. If K is less than N, then the actual encoded signature signal would comprise a bit signifying that method E' was used, followed by the K bytes of the encoded signature. Thus, in the example shown in FIG. 6, a bit of "1" followed by $S_1' \ldots S_k$, is used to denote that the method E' was used with the resultant encoded signature signal comprising $S_1' \ldots S_k'$. Conversely, if method E had resulted in fewer bytes of storage requirements, the initial bit would be set to "0", signifying that the method E was used.

Figure 7:
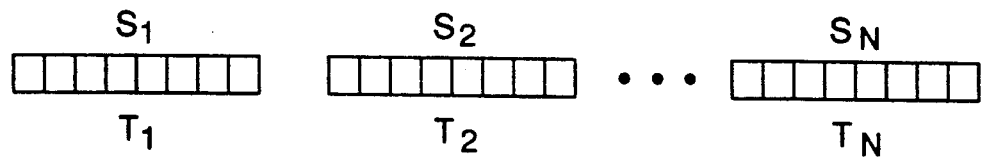
FIG. 7 is a schematic drawing showing the encoding of the segments of a human signature, along with their associated timing marks.

One particular aspect of signature verification of POS transactions is the desirability of preventing forgeries. In another variation of the method of the present invention, an internal clock within the computer 18 is used to keep track of the timing for each of the encoded segments. Thus, as the human signature is captured by the electronic tablet 24, a real-time clock is used to time the writing of each of the segments or group of segments, of the human signature. Thereafter, as each segment is encoded, a timing signal associated with that signature segment or group of segments is also stored. Thus, referring to FIG. 7, there is shown a signature encoded by the method of the present invention comprising of segments $S_1 \ldots S_n$. For each of the signature segments $S_i$, there is a timing signal $T_i$ associated therewith. Both the encoded signature segment and the timing signal for all of the segments are encoded and combined with the transaction signal to form the record signal. As part of signature verification, another aspect of the present invention can be to compare the timing relationship of the writing of each of the segments to the stored data with regard to the timing of writing of each of the segments. This will be in addition to the comparison of the segments of the signatures themselves. This would further foil incidence of forgery.

As can be seen from the foregoing, the method and apparatus of the present invention provides for a simplified and economic solution to the problem of total electronic POS transaction involving a human signature for verification of this transaction, as well as for request of extension of credit by a credit company. Although the invention has been described with respect to a human signature, the invention is also applicable any other form of handwritten information. Thus, as used herein, the term "human signature" includes all types of handwritten information. Further, although the invention has been described with respect to a POS retail transaction, the invention also has applicability in any type of transaction, involving a human signature (including handwritten information), such as signed securities exchange transaction, signed electronic fund transfer or electronic teller transaction, or signed proof of delivery transaction.

Although the apparatus is shown as employing a general-purpose computer 18 with the program described herein the apparatus to accomplish the method of the present invention can also be a dedicated hardware including a DSP signal processor with appropriate circuitry. Finally, although the Fibonacci series 1,2,3,5,8,13 . . . is used for the construction of the spacing of the rings, the invention is not so limited. Any spacing of the rings can be used so long as the total number of grid points along the perimeter of all of the rings is less than or equal to 256, in the case of a computer with an 8-bit byte. Similarly, the method can be extended to computers that use memory lengths other than 8-bit bytes (such as 16 bits, or 32 bits).

What is claimed is:

1. A method for electronically processing a transaction having a human signature for verification of said transaction, said method comprising the steps of:
   electronically capturing said transaction at said point of transaction to form a transaction signal;
   electronically capturing said human signature at said point of transaction to form a signature signal;
   compressing said signature signal to form a compressed signature signal;

dividing said signature signal into a plurality of signature segment signals;
encoding each signature segment signal by selecting N rings sized by the Fibonacci series of
1, 2, 3, 5, 8, 13
in a Modified Ring Encoding Method with each ring having a number of grid points, and where the total number of grid points is less than or equal to 256;
combining said compressed signature signal with said transaction signal to form a record signal; and
processing said record signal.

2. A method for electronically processing a transaction having a human signature for verification of said transaction, said method comprising the steps of:
electronically capturing said transaction at said point of transaction to form a transaction signal;
electronically capturing said human signature at said point of transaction to form a signature signal;
compressing said signature signal by a first compressing method to form a first compressed signature signal;
compressing said signature signal by a second compressing method different from said first method to form a second compressed signature signal;
comparing said first compressed signature signal to said second compressed signature signal;
selecting the smaller size of the two first and second compressed signature signal as the compressed signature signal and using an additional bit to distinguish the two methods;
combining said compressed signature signal with said transaction signal to form a record signal; and
processing said record signal.

3. An apparatus for electronically processing a transaction having a human signature for verification of said transaction, said apparatus comprising:
means for electronically capturing said transaction at said point of transaction to form a transaction signal;
means for electronically capturing said human signature at said point of transaction to form a signature signal;
means for dividing said signature signal into a plurality of signature segment signals;
means for encoding each signature segment signal by selecting N rings sized by the Fibonacci series of
1, 2, 3, 5, 8, 13
in a Modified Ring Encoding Method with each ring having a number of grid points along its perimeter, and where the total number of grid points in less than or equal to 256;
means for combining said compressed signature signal with said transaction signal to form a record signal; and
means for processing said record signal.

4. An apparatus for electronically processing a transaction having a human signature for verification of said transaction, said apparatus comprising:
means for electronically capturing said transaction at said point of transaction to form a transaction signal;
means for electronically capturing said human signature at said point of transaction to form a signature signal;
means for compressing said signature signal by a first compressing method to form a first compressed signature signal;
means for compressing said signature signal by a second compressing method to form a second compressed signature signal;
means for comparing said first compressed signature signal to said second compressed signature signal;
means for selecting the smaller size of the two first and second compressed signature signal as the compressed signature signal and using an additional bit to distinguish the two methods;
means for combining said compressed signature signal with said transaction signal to form a record signal; and
means for processing said record signal.

* * * * *